United States Patent Office 2,968,546
Patented Jan. 17, 1961

2,968,546

PROCESS FOR PRODUCING PHOSPHATE-CONTAINING FERTILIZERS

Hugo Nees, Koln-Bruck, and Karl Geiersberger, Koln-Deutz, Germany, assignors to Chemische Fabrik Kalk, G.m.b.H., Koln-Kalk, Germany No Drawing. Filed July 8, 1957, Ser. No. 670,385

9 Claims. (Cl. 71—39)

This invention relates to an improved process for producing phosphate-containing fertilizers with a diminished mole ratio of CaO to $P_2O_5$ from that contained initially in the phosphate rock by treating phosphate rock with nitric acid sufficient to render water soluble practically the entire quantity of phosphate initially contained in said phosphate rock, ammoniating the disintegration mixture after diminishing the CaO-content therein, and during the ammoniation adding stabilizing metal ions to the mass.

The above-mentioned diminution in the mole ratio of CaO to $P_2O_5$ is effected in well-known manner by crystallizing a suitable quantity of calcium nitrate tetrahydrate, by cooling the disintegration mixture and separating said calcium nitrate tetrahydrate from said mixture, for example by filtration or centrifuging.

The diminished mole ratio of CaO to $P_2O_5$ in the obtained mother liquor is preferably so adjusted that to every 1 mol $P_2O_5$ there is a quantity of about 1.5 to 2.1 mol CaO, not including such CaO which is generally present in the form of calcium fluoride. Consequently even in the case of the mole ratio of $CaO/P_2O_5=2.1$ the corresponding quantity of CaO present in said liquor is not larger than that necessary for converting the entire quantity of $P_2O_5$ present in the liquor into dicalcium phosphate during the ammoniation step, whereas when adjusting to the lower ratios it is possible to form water-soluble monocalcium phosphate in addition to dicalcium phosphate.

It is well-known that it is difficult to carry out the ammoniation of the nitrous disintegration solution so that the phosphoric acid contained in the final product is practically entirely soluble in the ammonium citrate solution and remains so even if the fertilizer is stored for a long period.

To overcome this difficulty numerous suggestions have been made. One of these suggestions, according to the U.S. Patent No. 2,739,054, consists in adding to the disintegration mixture, prior to the ammoniation step, equivalent quantities of magnesium and sulphate ions, so that there are at least 20 molecules of magnesium and 20 molecules of $SO_4$ to 100 molecules of $P_2O_5$.

To attain the same object in the French Patent No. 1,043,483, the owner of which is identical with the owner of the above-mentioned U.S. patent, iron(II)-ions are added in such quantities that there are at least 20 molecules of iron to 100 molecules of the total of the phosphoric acid. The same place of introduction and the same mole relation is claimed by the same owner for the above-mentioned purpose in the French Patent No. 1,062,974 regarding the addition of iron(III)-ions and in the Swiss Patent No. 300,032 regarding the addition of aluminium ions.

This invention relates to the preparation of complex fertilizers containing nitrogen in the form of nitrates and nitrogen in ammoniated form and phosphoric acid in the form of phosphates completely soluble in ammonium citrate and in which the mole ratio of CaO to $P_2O_5$ is between 1.5 and 2.1, not including such CaO which is generally present in the form of calcium fluoride. Said complex fertilizers are obtained according to the invention by treating phosphate rock with nitric acid, cooling the disintegration mixture to crystallize out a suitable quantity of calcium nitrate tetrahydrate, separating said calcium nitrate tetrahydrate from the disintegration mixture, ammoniating the obtained mother liquor and during the ammoniation treatment when the pH of the mass is between pH 2.5 and 6.7, adding a minor quantity of stabilizing metal ions to the mass.

When in this specification and the appended claims the term "stabilizing metal ions" is used it is intended to refer to one or more of the following ions: magnesium-, aluminium-, iron(II)- and iron(III)-ions.

A practically complete stabilization of the phosphoric acid is obtained if said stabilizing metal ions are added to the ammoniation mixture at a pH value of 2.5 to 6.7, preferably 5.0 to 6.4, in such quantities that there are 1 to 5, preferably 2 to 4, molecules of said stabilizing metal to 100 molecules of $P_2O_5$ present in the mass. In the process according to the invention, therefore, much smaller quantities of stabilizing metal ions are required than were hitherto necessary for obtaining the same effect.

In consequence of the smaller quantities of stabilizing metal ions applied in the process according to the invention than applied in the processes of prior art there are obtained more liquid and, therefore, better workable ammoniation mixtures than such obtained hitherto.

The ions of each of the above-mentioned metals can be used alone or together with those of one or more of the other metals mentioned. It has been found particularly advantageous as regards the stabilizing effect to use magnesium ions in conjunction with aluminium ions. By this means certain favorable mixture proportions can be introduced for stabilizing the dicalcium phosphate. Thus, for example in the case of the joint use of magnesium and aluminium ions the most advantageous mole ratio of Mg to Al is from 2 to 1 to 1.

It has further been found that for the stabilizing metal ions the ammoniating mixture should preferably have certain optimum pH values when they are introduced. For example, the magnesium ions are preferably introduced when the pH value is about 3 to 6.4; aluminium ions or iron ions when it is about 5.4 to 6.4.

That in the process according to the invention considerably smaller quantities of stabilizing metal ions are required than was necessary hitherto for obtaining the same effect, is due to the fact that in the process according to the invention a much more suitable place is chosen for introducing the stabilizing metal ions than was hitherto the case. If, for example, the magnesium, aluminium-, iron(II)- or iron(III)-ions are added to the disintegration mixture—as was previously proposed—that is, before the introduction of the neutralizing agent, a precipitation of silicates and other compounds of the stabilizer cation takes place even before the precipitation of the dicalcium phosphate which is to be protected by the stabilization, so that a considerable quantity of the added stabilizing metal ions is no longer available for the stabilizing action. If, on the other hand, the stabilizing metal ions are added after the neutralization of the disintegration mixture is completed, the stabilizer does not become active.

The stabilizing metal ions are added to the ammoniating mixture in the form of their compounds which are soluble in the reagent, especially in the form of their sulphates, nitrates or chlorides.

The ions of one or more of the above-mentioned metals can also be added in the form of acid or alkaline disintegration products of such substances, especially mineral substances which contain one or more of the abovementioned metals, preferably in a suitable quantitative ratio.

It has been discovered that in the production of N–P–K composite fertilizers, both the ammoniating process and also the stabilization are considerably assisted by the fact that technical potash salts of commercial quality are added to the ammoniating mixture, not after the termination of the ammoniating process but during the ammoniating process at pH values of 4 to 6.4, preferably 4.5 to 6. Either a portion or even the entire quantity of commercial potash salt which is required for producing a certain $K_2O$ content in the composite fertilizer, can be introduced into the ammoniating mixture at the above-mentioned pH values.

The process according to the invention can be carried out intermittently or continuously. If the process is continuous the ammoniation is preferably carried out in several containers connected in series and which are equipped with suitable intermixing devices. Certain pH value stages, rising from the first to the last container, are obtained by suitable regulation of the ammonia feed to the individual containers, the addition of the stabilizer metal ions preferably taking place, according to the number of ammoniating containers used, in that container in which the contents have the pH value most suitable for activating the particular stabilizer.

*Example 1*

1000 kg. of Morocco phosphate (33% $P_2O_5$) is disintegrated with 2540 kg. of nitric acid (54%) at a temperature of 35–40° C. The disintegration mixture is cooled to about 16° C. 1110 kg. calcium nitrate tetrahydrate is crystallized out of the disintegration mixture. The crystals are filtered off and washed with nitric acid (54%). The washed material can be used for fertilizing purposes.

197 kg. of ammonia is introduced into the mother liquor obtained under intensive stirring. On obtaining a pH value of about 4.7, 19 kg. of crystallized magnesium sulphate ($MgSO_4 + 7H_2O$) is added to the ammoniating mixture. The ammoniation is continued to a pH value of about 7.0.

Then the slightly pasty mass is mixed with a suitable amount of the resultant material of small particle size, i.e. "fines," and granulated and dried in the known manner.

A composite fertilzer with 18.5% N and 18.5% $P_2O_5$ is obtained. Of the total phosphoric acid, 98.8% is soluble in ammonium citrate solution.

*Example 2*

The same amounts of crude phosphate and nitric acid are used as in Example 1.

The procedure is the same as in Example 1 with the difference that on attaining a pH value of about 6.0, 26 kg. of crystallized aluminium sulphate $$(Al_2(SO_4)_3 \cdot 18H_2O)$$

is added to the ammoniating mixture.

The slightly pasty mass (pH=6.9) is mixed with a suitable amount of "fines," granulated and dried in the known manner.

A composite fertilizer with 18.5% N and 18.5% $P_2O_5$ is obtained. Of the total phosphoric acid, 98.6% is soluble in ammonium citrate solution.

*Example 3*

The same amounts of crude phosphate and nitric acid are used as in Example 1.

The procedure is the same as in Example 1 with the difference that on attaining a pH value of about 3.8, 16 kg. of crystallized magnesium nitrate is added, and on attaining a pH value of about 5.8, 24 kg. of crystallized aluminium nitrate is added to the ammoniating mixture.

Then the slightly pasty mass (pH=6.9) is mixed with a suitable amount of fines, granulated and dried in the known manner.

A composite fertilizer with 18.5% N and 18.5% $P_2O_5$ is obtained. Of the total phosphoric acid, 99.0% is soluble in ammonium citrate solution.

*Example 4*

The same amounts of crude phosphate and nitric acid are used as in Example 1.

The procedure is the same as in Example 1 with the difference that on attaining a pH value of about 5.0, 16 kg. crystallized magnesium chloride ($MgCl_2 \cdot 6H_2O$) is added to the ammoniating mixture. On reaching a pH value of 6.3, the ammoniating mixture is mixed with 370 kg. of technical potassium chloride.

The free flowing mass (pH=7.0), after adding a suitable amount of "fines," is granulated and dried in the known manner.

A composite fertilizer with 12% N, 12% $P_2O_5$ and 20% $K_2O$ is obtained. Of the total phosphoric acid, 99.1% is soluble in ammonium citrate solution.

*Example 5*

The same amounts of crude phosphate and nitric acid are used as in Example 1.

The procedure is the same as in Example 4 with the difference that on attaining a pH value of about 5.7, 23 kg. of crystallized iron(II)-sulphate is added to the ammoniating mixture. When a pH value of 6.2 is reached, the ammoniating mixture is mixed with 240 kg. of technical potassium chloride.

The free flowing mass (pH=6.9), after adding a suitable amount of "fines," is granulated and dried in the known manner.

A composite fertilizer with 14% N, 14% $P_2O_5$ and 14% $K_2O$ is obtained. Of the phosphoric acid, 99.0% is soluble in ammonium citrate solution.

*Example 6*

The same amounts of crude phosphate and nitric acid are used as in Example 1.

The procedure is the same as in Example 4 with the difference that on attaining a pH value of 6.1, 25 kg. of crystallized iron(III)-nitrate is added to the ammoniating mixture. When a pH value of 6.2 is reached, the ammoniation mixture is mixed with 500 kg. of technical potassium chloride.

The free flowing mass (pH=6.9), after adding a suitable amount of "fines," is granulated and dried in the known manner.

A composite fertilizer with 11% N, 11% $P_2O_5$ and 22% $K_2O$ is obtained. Of the total phosphoric acid, 99.2% are soluble in ammonium citrate solution.

Both in the description and in the claims pH values are determined in dilutions of one in one hundred parts of water.

By way of illustration the invention has been described in a varied range of materials and proportions. The invention is limited however only by the scope of the following claims.

What we claim is:

1. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is no larger than that required to form dicalcium phosphate with the $P_2O_5$ initially present in said phosphate rock, during the following ammoniation of the mother liquor, introducing ammonia to render the mass to a pH not substantially less than pH 7, and during the ammoniation when the pH of the mass is between 2.5 and 6.7, adding to the mass stabilizing metal ions selected from the group consisting of magnesium-, aluminum-, iron(II)- and iron(III)-ions in an amount corresponding to the proportion from about 1 to about 5 moles of stabilizing metal selected from said group per each 100 moles of $P_2O_5$ present in the mass, said stabilizing metal ions acting in said mass to prevent reversion of said dicalcium phosphate during the ammoniation to a form which is insoluble in ammonium-citrate.

2. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is no larger than that required to form dicalcium phosphate with the $P_2O_5$ initially present in said phosphate rock, during the following ammoniation of the mother liquor introducing ammonia to render the mass to a pH not substantially less than pH 7, and during the ammoniation when the pH is between 5.0 and 6.4, adding to the mass stabilizing metal ions selected from the group consisting of magnesium-, aluminum-, iron(II)- and iron(III)-ions in an amount corresponding to the proportion from about 1 to about 5 moles of stabilizing metal selected from said group per each 100 moles of $P_2O_5$ present in the mass, said stabilizing metal ions acting in said mass to prevent reversion of said dicalcium phosphate during the ammoniation to a form which is insoluble in ammonium citrate.

3. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is no larger than that required to form dicalcium phosphate with the $P_2O_5$ initially present in said phosphate rock, during the following ammoniation of the mother liquor, introducing ammonia to render the mass to a pH not substantially less than pH 7, and during the ammoniation when the pH of the mass is between 2.5 and 6.7, adding to the mass stabilizing metal ions selected from the group consisting of magnesium-, aluminum-, iron(II)- and iron(III)-ions in an amount corresponding to the proportion from about 2 to about 4 moles of stabilizing metal selected from said group per each 100 moles of $P_2O_5$ present in the mass, said stablizing metal ions acting in said mass to prevent reversion of said dicalcium phosphate during the ammoniation to a form which is insoluble in ammonium citrate.

4. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is no larger than that required to form dicalcium phosphate with the $P_2O_5$ initially present in said phosphate rock, during the following ammoniation of the mother liquor, introducing ammonia to render the mass to a pH not substantially less than pH 7, and during the ammoniation when the pH is between 4.5 and 6.5, adding to the mass stabilizing metal ions selected from the group consisting of magnesium-, aluminum-, iron(II)- and iron(III)-ions in an amount corresponding to the proportion from about 2 to 4 moles of stabilizing metal selected from said group per each 100 moles of $P_2O_5$ present in the mass, said stabilizing metal ions acting in said mass to prevent reversion of said dicalcium phosphate during the ammoniation to a form which is insoluble in ammonium citrate.

5. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is not larger than that required to form dicalcium phosphate with the $P_2O_5$ initially present in said phosphate rock, during the following ammoniation of the mother liquor introducing ammonia to render the mass to a pH not substantially less than pH 7, and during the ammoniation when the pH is between 3.0 and 6.4, adding to the mass magnesium ions in an amount corresponding to the proportion of from 2 to 4 molecules of Mg to 100 molecules of $P_2O_5$, said magnesium ions acting in said mass to prevent reversion of said dicalcium phosphate during the ammoniation to a form which is insoluble in ammonium citrate.

6. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is not larger than that required to form dicalcium phosphate with the $P_2O_5$ initially present in said phosphate rock, during the following ammoniation of the mother liquor, introducing ammonia to render the mass to a pH not substantially less than pH 7, and during the ammoniation when the pH is between 5.4 to 6.4 adding to the mass aluminum ions in an amount corresponding to the proportion of from 2 to 4 molecules of Al to 100 molecules of $P_2O_5$, said aluminum ions acting in said mass to prevent reversion of said dicalcium phosphate during the ammoniation to a form which is insoluble in ammonium citrate.

7. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is not larger than that required to form dicalcium phosphate with the $P_2O_5$ initially present in said phosphate rock, during the following ammoniation of the mother liquor introducing ammonia to render the mass to a pH not substantially less than pH 7, and during the ammoniation when the pH is between 5.4 to 6.4, adding to the mass iron(II)-ions in an amount corresponding to the proportion of from 2 to 4 molecules of Fe to 100 molecules of $P_2O_5$, said iron ions acting in said mass to prevent reversion of said dicalcium phosphate during the ammoniation to a form which is insoluble in ammonium citrate.

8. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is not larger than that required to form dicalcium phosphate with the $P_2O_5$ initially present in said phosphate rock, during the following ammoniation of the mother liquor introducing ammonia to render the mass to a pH not substantially less than pH 7, and during the ammoniation when the pH is between 5.4 to 6.4, adding to the mass iron(III)-ions in an amount corresponding to the proportion of from 2 to 4 molecules of Fe to 100 molecules of $P_2O_5$, said iron ions acting in said mass to prevent reversion of said dicalcium phosphate during the ammoniation to a form which is insoluble in ammonium citrate.

9. The process of producing a complex fertilizer containing nitrogen in the form of nitrates and nitrogen in ammoniated form and phosphoric acid in the form of phosphates soluble in ammonium citrate which comprises treating phosphate rock with nitric acid to render water soluble practically all the phosphate initially contained in said phosphate rock, cooling the disintegration mixture and crystallizing and separating calcium nitrate tetrahydrate from said mixture to adjust in the mother liquor a mole ratio of CaO to $P_2O_5$ within the range from about 1.5 to 2.1, not including such CaO present in the form of insoluble calcium fluoride initially contained in said phosphate rock, so that the quantity of soluble CaO present in the mother liquor is no larger than that required to form dicalcium phosphate with the $P_2O_5$ initially present in said phosphate rock, during the following ammoniation of the mother liquor introducing ammonia to render the mass to a pH not substantially less than pH 7, and during the ammoniation when the pH of the mass is between 2.5 and 6.7, adding to the mass stabilizing metal ions selected from the group consisting of magnesium-, aluminum-, iron(II)- and iron(III)-ions in an amount corresponding to the proportion from about 1 to about 5 moles of stabilizing metal selected from said group per each 100 moles of $P_2O_5$ present in the mass, said stabilizing metal ions acting in said mass to prevent reversion of said dicalcium phosphate during the ammoniation to a form which is insoluble in ammonium citrate incorporating a suitable amount of potassium containing salt, particularly potassium chloride of commercial quality, during the ammoniation treatment when the pH of the mass is between pH 4 and pH 6.4, and after completion of the ammoniation mixing the mass with a suitable amount of the resultant material of small particle size, granulating and drying the mixture.

References Cited in the file of this patent

UNITED STATES PATENTS

| | | |
|---|---|---|
| 2,738,265 | Nielsson | Mar. 13, 1956 |
| 2,739,054 | Andres et al. | Mar. 20, 1956 |
| 2,769,703 | Andres et al. | Nov. 6, 1956 |
| 2,769,704 | Andres et al. | Nov. 6, 1956 |
| 2,783,139 | Datin | Feb. 26, 1957 |
| 2,845,340 | Karbe et al. | July 29, 1958 |